United States Patent [19]

Flint

[11] 4,437,376
[45] Mar. 20, 1984

[54] APPARATUS FOR CONTROLLING AND RELEASING PRESSURE OF A TOOL ON A WORKPIECE

[76] Inventor: David L. Flint, 4430 Asbury Dr., Toledo, Ohio 43612

[21] Appl. No.: 379,651

[22] Filed: May 19, 1982

[51] Int. Cl.³ .................................. C03B 33/12
[52] U.S. Cl. ............................ 83/886; 83/563; 83/648; 83/881
[58] Field of Search ............. 83/881, 886, 879, 880, 83/648, 856, 563

[56] References Cited

U.S. PATENT DOCUMENTS

| | | | |
|---|---|---|---|
| 3,459,078 | 8/1969 | Black | 83/881 |
| 4,120,220 | 10/1978 | Mullen | 83/886 |
| 4,175,684 | 11/1979 | Butler | 83/886 X |
| 4,222,300 | 9/1980 | El-Habr | 83/886 |
| 4,385,540 | 5/1983 | Dieter | 83/886 |

*Primary Examiner*—Frank T. Yost
*Attorney, Agent, or Firm*—Allen D. Gutchess, Jr.

[57] ABSTRACT

Apparatus is provided for controlling and quickly releasing pressure of a tool on a workpiece. In a preferred and specific embodiment, the apparatus is employed to hold a glass cutter and to control the pressure of a cutting wheel of the cutter on a workpiece. The apparatus includes means forming a flat supporting surface for the workpiece with a mounting stand affixed to the surface-forming means. An elongate tool-supporting arm is affixed to the stand and extends over the surface and has a tool clamp at the outer end for holding a commercially-available glass cutting tool, with the cutting end extending downwardly. The elongate supporting arm is pivotally connected to the stand and an adjusting member extends between the stand and the supporting arm and engages the supporting arm between the pivotal connection and the tool clamp. This can be adjusted by the operator to infinitely control the pressure of the tool on the workpiece supported on the flat surface. A release arm extends from the stand underneath the supporting arm and in the same direction, but stopping short of the tool and tool clamp. A release member extends between an outer end portion of the release arm and the supporting arm and can be manipulated by the operator to quickly raise and space the tool from the workpiece to enable quick release of the workpiece.

20 Claims, 2 Drawing Figures

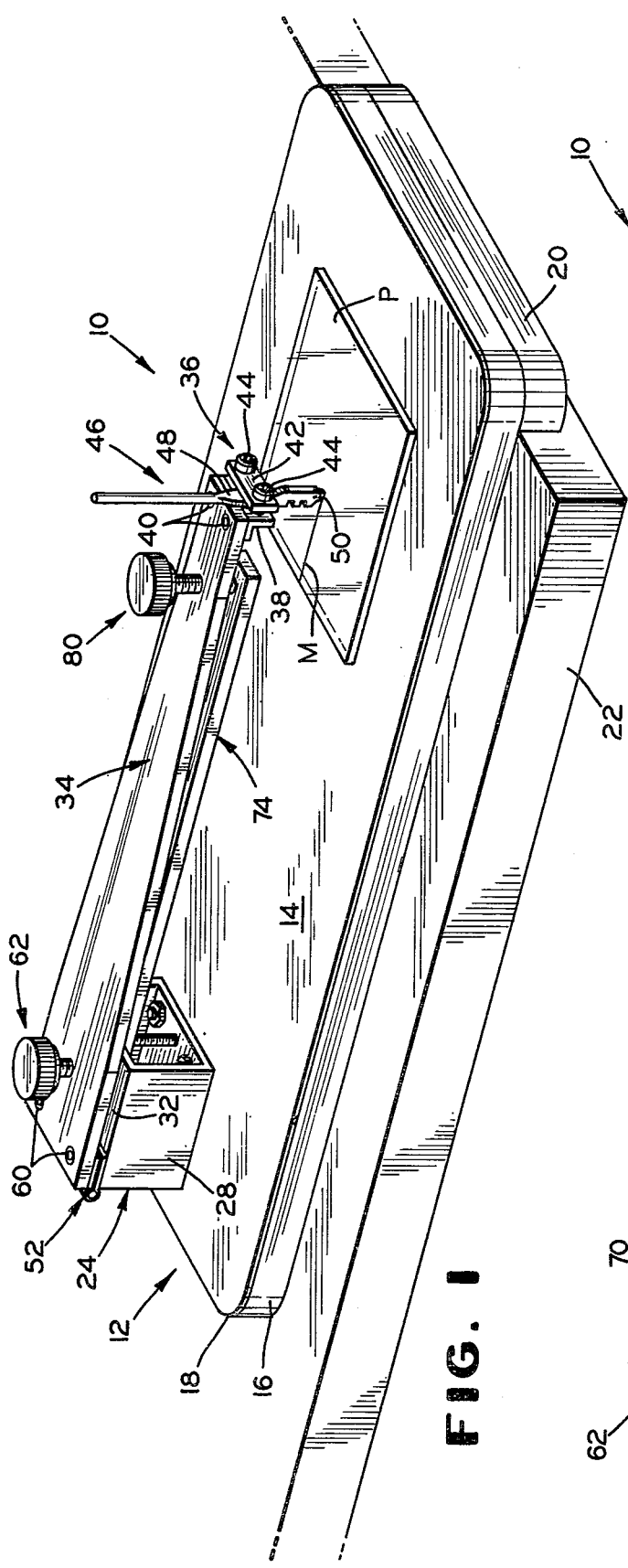
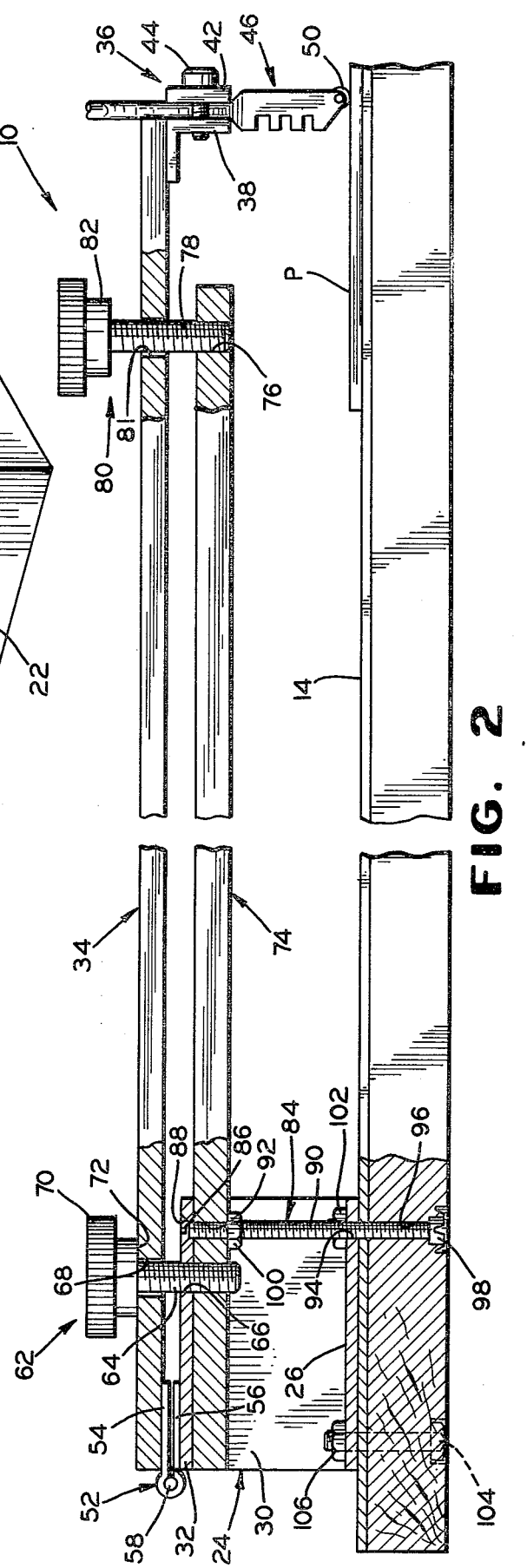
FIG. 1
FIG. 2

APPARATUS FOR CONTROLLING AND RELEASING PRESSURE OF A TOOL ON A WORKPIECE

This invention relates to apparatus for controlling pressure of a tool exerted on a workpiece and for quickly raising the tool from the workpiece.

In the preferred form, the apparatus is employed with a commercially-available glass cutter for controlling pressure of the tool on a piece of glass supported on a flat surface forming part of the apparatus. This pressure, in turn, controls the score line produced by the tool on the glass. The apparatus is equally effective for other brittle materials such as ceramic tiles which are to be scored and subsequently broken along the score line.

The apparatus includes a mounting stand mounted on the flat surface which supports the workpiece with an elongate, somewhat resilient, supporting arm extending from the stand over the workpiece. A tool holder or clamp is located on the outer end of the supporting arm. The elongate supporting arm is pivotally connected to the stand and an infinitely adjustable pressure member extends between and is engagable with the stand and the supporting arm at a position between the pivot and the tool holding means at the end of the arm. The adjustable pressure member can be turned by the operator to control the force of the pressure member on the supporting arm and, consequently, the pressure or force applied by the tool on the workpiece supported on the surface.

A release arm is also mounted on the mounting stand and extends over the surface in the same direction as the supporting arm, and preferably is below the supporting arm. A release member is connected to the release arm and extends through an opening in the supporting arm so that an upper portion of the release member can be pushed downwardly by the operator who at the same time exerts a force upwardly on the supporting arm to raise the supporting arm and to raise the tool above the workpiece. Thus, the pressure of the tool on the workpiece can be infinitely controlled by the operator and the tool can be quickly raised from the workpiece through the release member and the release arm.

The closest prior art known is U.S. Pat. No. 4,120,220, issued on Oct. 17, 1978. The apparatus disclosed therein employs a stiff arm and spring with a wing nut which provides some control over the tool pressure. The apparatus has no means for quickly and easily raising the tool from the glass being cut.

The apparatus according to the invention can also be employed with other tools beside glass cutters and for other workpieces besides glass and other similar brittle materials. For example, the apparatus can be used with a leather-working tool to form marks or impressions on leather. Also, it can be used with other tools such as scribers, knives, pens, and pencils to provide lines, scores, or similar marks on workpieces which are manipulated by the operator under the tool to form straight lines or lines of various shapes.

It is, therefore, a principal object of the invention to provide apparatus for controlling pressure of tools on workpieces and for quickly raising the tools from the workpieces.

Another object of the invention is to provide apparatus for holding a glass cutting tool and for closely controlling the pressure of the tool on a brittle piece of material which is to be scored.

A further object of the invention is to provide apparatus for holding a glass cutter and for quickly raising the glass cutter from the workpiece on which a line is being scored.

Yet another object of the invention is to provide apparatus for holding a marking tool and for both controlling the pressure applied by the tool on a workpiece and quickly raising the tool from a workpiece being marked.

Many other objects and advantages of the invention will be apparent from the following detailed description of a preferred embodiment thereof, reference being made to the accompanying drawings, in which:

FIG. 1 is an overall view in perspective of apparatus in accordance with the invention; and FIG. 2 is a fragmentary view in elevation, with parts broken away and with parts in cross section, of the apparatus of FIG. 1.

Referring to the drawings, apparatus for controlling and releasing pressure of a tool on a workpiece is indicated at 10. The apparatus 10 includes a planar member indicated at 12 and forming a work-supporting surface 14. The planar member 12 includes a board 16, such as flakeboard, and a plastic upper sheet 18 such as a plastic laminate of "Formica". This combination provides a stiff and yet smooth surface for a workpiece indicated at P which can be relatively easily slid on the smooth surface formed by the plastic sheet 18. An elongate stop or cleat 20 is affixed to the bottom of the board 16 at the front end thereof and can abut an edge of a work bench top 22 to position the apparatus 10 thereon.

A mounting stand 24 is located at and affixed to an end portion of the planar member 12. The stand 24 has a bottom wall 26, side walls 28 and 30, and a top wall 32 which provide a rigid structure for the stand.

An elongate, tool-supporting arm 34 extends from the mounting stand 24 over the workpiece-supporting surface 14 of the member 12. The supporting arm 34 tapers throughout most of its length, from a position above the front edge of the top wall 32 of the stand 24 to the outer end of the arm. A tool holder or clamp 36 is located at the outer end of the arm 34. The holder 36 can be of various designs, but, as shown, includes a bracket 38 affixed to the outer end of the arm 34 by suitable fasteners 40, such as rivets, and a bar 42 spaced from the bracket 38 by machine screws 44 which can be turned to move the bar 42 toward and away from the bracket 38. A tool 46, in this case a commercially-available glass cutting tool, has a shank or handle 48 clamped between the bracket 38 and the bar 42 with a cutting or scoring element, and specifically a cutting wheel 50, located at the lower end. The tool 46 can be initially manually positioned in the desired location and then held therein by tightening the screws 44.

The other end of the supporting arm 34 is pivotally connected to the mounting stand 24 by suitable means such as a hinge 52. The hinge 52 includes two hinge plates 54 and 56 connected by a pin 58 and suitably affixed to the arm 34 and the top wall 32 of the stand 24 by fasteners 60, such as rivets.

A pressure member indicated at 62 is located along the arm 34 between the pivot and the tool holder 36. The pressure member 62 includes a threaded shank 64 threadedly engaged in a hole 66 in the top wall 34 of the mounting stand 24. The shank 64 is affixed to an adjusting knob 70 having a lower shoulder 72 engaging the upper surface of the supporting arm 34 when the shank 64 is turned into the threaded hole 66 in the stand 24.

The shoulder 72 of the knob 70 exerts a downward force on the arm 34 as the shank 64 is turned further into the stand and the force or pressure of the cutting wheel 50 of the cutter 46 accordingly exerts greater force or pressure on the surface of the workpiece P.

An elongate release arm 74 also extends from the mounting stand 24 over the surface 14 in the same direction as the supporting arm 34. The outer end of the release arm 74 stops short of the tool 46 and has a threaded bore 76 therein which receives a threaded shank 78 of a release member 80, the threaded shank extending through a hole 81 in the arm 34 and being affixed to an upper knob 82. The release member 80 enables the supporting arm 34 to be raised to quickly separate the tool 46 from the workpiece P to release the workpiece whenever desired. This can be accomplished by the operator simply by placing the ends of two fingers under the lower surface of the supporting arm 34 and squeezing his hand to press down on the upper surface of the knob 82 with his palm or thumb, by way of example. This deflects the release arm 74 downwardly somewhat and also deflects the supporting arm 34 upwardly to raise the tool. Preferably, the release arm 74 is at least substantially as stiff as the supporting arm 34 to enable the desired effect to be achieved. It may be noted that the release member 80 can also be affixed to the supporting arm 34 and extend below the release arm 74 to also release the tool. This can be accomplished by the operator holding the release arm and the lower end of the release member and again squeezing his hand.

The other end of the release arm 74 is affixed to the lower surface of the top wall 32 of the supporting stand 24 by a long machine screw 84. The machine screw 84 has a head 86 countersunk in recess 88 in the upper surface of the top wall of the stand and has a long threaded shank 90 which extends through a hole or bore 92 in the release arm 74, through a hole 94 in the bottom wall 26 of the stand, and through a bore 96 and the member 12. The end of the threaded shank 90 is threadedly received in a tee-nut 98 embedded in the bottom surface of the board 16. A jam nut 100 is turned upwardly on the shank 90 against the bottom surface of the release arm 74 to hold the release arm firmly against the lower surface of the top wall 32 of the stand 24. A second jam nut 102 is turned downwardly on the shank 90 against the upper surface of the bottom wall 26 of the stand. This securely affixes the stand 24 in position on the planar member 12 along with a bolt 104 and a nut 106 located near the rear edge of the bottom wall 26. The shank 90 also supports the front portion of the top wall 32 of the stand relative to the planar member 12.

While the tool 46 can be a glass cutter to produce a mark M in the form of a score line on the workpiece P of glass or other brittle material, other tools can also be employed. These can be in the form of scribers to produce score lines on workpieces or such tools as knives, pens, pencils, or leather-working tools. Each tool requires a different amount of pressure for the ultimate mark desired on the workpiece and the ultimate ease in manipulation of the workpiece by the operator. The amount of pressure of the glass cutter on the glass or similar workpiece also will vary in accordance with the hardness of the material, the sharpness of the tool, and the desires of the particular operator.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. Mounting apparatus for holding a tool for forming a mark on a workpiece manipulated by hand under the tool, said apparatus comprising means forming a flat supporting surface for the workpiece, a mounting stand affixed to said surface-forming means, a release arm extending from said stand over said surface, a tool-supporting arm extending from said stand over said surface in the same direction as said release arm, tool holding means carried by said supporting arm, pressure means engagable with said supporting arm and said stand to urge the outer end of said supporting arm toward said surface, and means engagable with one of said release arm and said supporting arm and extending between said release arm and said supporting arm to enable said supporting arm to be manually moved away from said surface when it is desired to remove the workpiece from contact with the tool held by said tool holding means of said supporting arm.

2. Mounting apparatus according to claim 1 characterized by said supporting arm being pivotally connected to said stand and said pressure means comprising a threaded shank threadedly engaged with said stand and a knob on said shank engagable with said supporting arm.

3. Mounting apparatus according to claim 1 characterized by said engagable means being affixed to one of said release arm and said supporting arm.

4. Apparatus according to claim 1 characterized by said engagable means comprising a threaded shank threadedly engaged with one of said supporting arms and release arm, said threaded shank extending through an opening in the other one of said supporting arm and said release arm and having a knob on the side of said other one of said supporting arm and said release arm opposite the side on which is the threadedly-engaged portions of said shank.

5. Mounting apparatus according to claim 1 characterized by said release arm being below said supporting arm.

6. Mounting apparatus according to claim 1 characterized by said mounting stand comprising side walls and a top wall, with said tool supporting arm and said release arm being affixed to said top wall.

7. Mounting apparatus according to claim 6 characterized by said tool-supporting arm being affixed to the upper surface of said top wall and said release arm being affixed to the lower surface of said top wall.

8. Mounting apparatus according to claim 2 characterized by said mounting stand comprising side walls and a top wall with said threaded shank being threadedly engaged with said top wall of said stand and said supporting arm being pivotally connected to said top wall of said stand.

9. Mounting apparatus according to claim 8 characterized by a threaded shank extending between said top wall and said supporting surface and engaging said top wall adjacent the location where said threaded shank of said pressure means is threadedly engaged.

10. Glass cutting apparatus for scoring pieces of glass or similar brittle material, said apparatus comprising a glass cutting tool, means forming a flat supporting surface for the pieces, a mounting stand affixed to said surface-forming means, a tool supporting arm extending from said stand over said surface, means on an outer portion of said supporting arm for holding said glass cutting tool with a cutting end of said tool extending downwardly from said supporting arm, means pivotally connecting said supporting arm to said stand, a threaded shank affixed to said stand and extending upwardly above said supporting arm between said tool holding means and said pivot means, and a knob on said threaded shank which can be turned toward and away from said stand to engage said supporting arm and urge the outer end portion of said supporting arm toward the surface to increase the pressure of said glass cutting tool on the piece supported on said surface.

11. Glass cutting apparatus according to claim 10 characterized by said mounting stand having a top wall, said pivotal connecting means connecting said supporting arm to the upper surface of said top wall, and said threaded shank being affixed to said top wall.

12. Glass cutting apparatus according to claim 10 characterized by said supporting arm having a hole between said tool holding means and said pivot means through which said threaded shank extends.

13. Glass cutting apparatus according to claim 12 characterized by said knob engaging the upper surface of said supporting arm around said hole.

14. Glass cutting apparatus according to claim 10 characterized by a release arm extending from said stand over said surface in the same direction as said supporting arm, and release means carried by one of said supporting arm and said release arm to enable an operator to quickly and easily raise the supporting arm to separate the cutting tool from the piece.

15. Glass cutting apparatus according to claim 14 characterized by said release means extending beyond the other of said supporting arm and said release arm whereby the operator can raise the supporting arm by manipulating said release means and the one of said supporting arm and said release arm beyond which said release means extends.

16. Glass cutting apparatus for scoring pieces of glass, or similar brittle material, said apparatus comprising a glass cutting tool, means forming a flat supporting surface for the pieces, a mounting stand affixed to said surface forming means, a tool supporting arm extending from said stand over said surface, means on an outer end portion of said supporting arm for holding said glass cutting tool with a cutting end of said tool extending downwardly from said supporting arm, means engagable with said supporting arm to increase and decrease pressure of said cutting tool on the piece supported on said surface, a release arm extending from said stand over said surface in the same direction as said supporting arm and being below said supporting arm, release means carried by one of said supporting arm and said release arm and extending beyond the other of said supporting arm and said release arm whereby said release means can be manipulated by an operator in conjunction with the one of said supporting arm and said release arm beyond which said release means extends to raise the cutting tool from pieces supported on said supporting surface.

17. Glass cutting apparatus according to claim 16 characterized by means pivotally connecting said supporting arm between said pivotal connection and said holding means.

18. Glass cutting apparatus according to claim 17 characterized by said mounting stand having side walls and a top wall with said pivotal connecting means connecting said supporting arm to said top wall, and said pressure means comprising a threaded shank threadedly received in said top wall and having knob means on the side of said supporting arm opposite said top wall for engaging said supporting arm to increase and decrease the pressure of said cutting tool.

19. Glass cutting apparatus according to claim 18 characterized by said supporting arm having a hole between said tool holding means and said pivotal connecting means through which said threaded shank extends.

20. Glass cutting apparatus according to claim 16 characterized by said release means comprising a shank affixed to said release arm and extending beyond said supporting arm for releasing said supporting arm when said shank and said supporting arm are manipulated by the operator.

* * * * *